United States Patent [19]
Castille

[11] Patent Number: 5,497,502
[45] Date of Patent: Mar. 5, 1996

[54] METHOD AND APPARATUS FOR TRANSMITTING INFORMATION RECORDED ON DIGITAL DISKS FROM A CENTRAL SERVER TO SUBSCRIBERS VIA A HIGH DATA RATE DIGITAL TELECOMMUNICATIONS NETWORK

[75] Inventor: Jean-Paul G. Castille, Cavaillon, France

[73] Assignee: Genese, Robion, France

[21] Appl. No.: 196,765

[22] Filed: Feb. 14, 1994

Related U.S. Application Data

[63] Continuation of Ser. No. 784,450, filed as PCT/FR90/00353, May. 18, 1990, abandoned.

[30] Foreign Application Priority Data

Jun. 7, 1989 [FR] France .................................. 89 07759

[51] Int. Cl.$^6$ ...................................................... H04H 1/08
[52] U.S. Cl. ................. 455/5.1; 455/4.2; 348/7; 348/10; 348/12; 369/34; 369/36
[58] Field of Search ............................. 455/3.1, 4.1, 4.2, 455/5.1, 6.3, 6.1; 348/6, 7, 8, 10, 12, 13; 369/34, 36; 414/272, 273, 274; 221/88, 129; 379/90, 93, 101

[56] References Cited

U.S. PATENT DOCUMENTS

| | | | |
|---|---|---|---|
| 4,506,387 | 3/1985 | Walter | 358/86 |
| 4,616,263 | 10/1986 | Eichelberger . | |
| 4,648,123 | 3/1987 | Schrock | 455/5.1 |
| 4,766,581 | 8/1988 | Korn et al. | 369/34 |
| 4,769,833 | 9/1988 | Farleigh et al. | 455/4.2 |
| 4,844,679 | 7/1989 | Teranishi | 414/273 |
| 4,867,628 | 9/1989 | Ammon et al. | 414/273 |
| 4,891,720 | 1/1990 | Grant et al. | 369/36 |
| 5,132,789 | 7/1992 | Ammon et al. | 455/5.1 |
| 5,133,079 | 7/1992 | Ballantyne et al. | 455/5.1 |

OTHER PUBLICATIONS

Japan Telecommunications Review (JTR), vol. 28, No. 4, Oct. 1986, pp. 264–270: S. Yokoi: "New Video . . . VRS".

British Telecommunications Engineering, vol. 6, No. 1, Apr. 1987, pp. 17–22; G. W. Kerr: "On–Demand . . . Network".

Preliminary Examination Report For PCT/FR90/00353 May 18, 1990.

Preliminary Examination Report (In English) for PCT/FR90/00353.

*Primary Examiner*—Reinhard J. Eisenzopf
*Assistant Examiner*—Nguyen Vo
*Attorney, Agent, or Firm*—Claire Ann Koegler

[57] ABSTRACT

The invention provides a method and apparatus for transmitting information recorded on a collection of digital disks from a central server via a high data rate digital telecommunications network to subscribers connected to the network. Apparatus of the invention includes a central server (1) connected via an interface (5) to a digital telecommunications network (2) to which subscriber stations (3) are connected. The server center includes a central computer (4), a digital disk magazine (7), digital disk players ($10_1$, $10_2$, ..., $10_n$) and disk transferring equipment between the magazine and the players, which includes a conveyor (8) and a disk handling device (50) controlled by a disk controller (6) itself controlled by the central computer. One application delivers personalized sound programs selected from a very large directory to the subscribers.

10 Claims, 7 Drawing Sheets

FIG_1

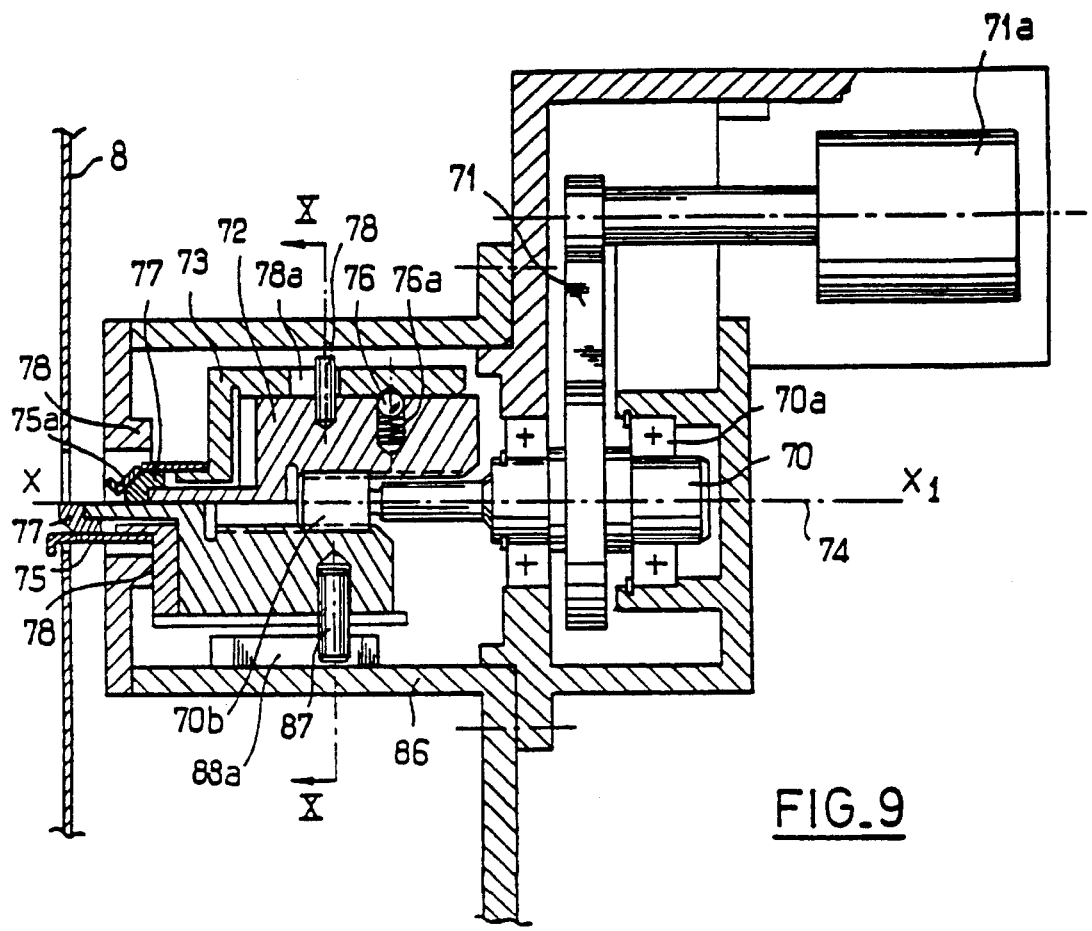
FIG_9
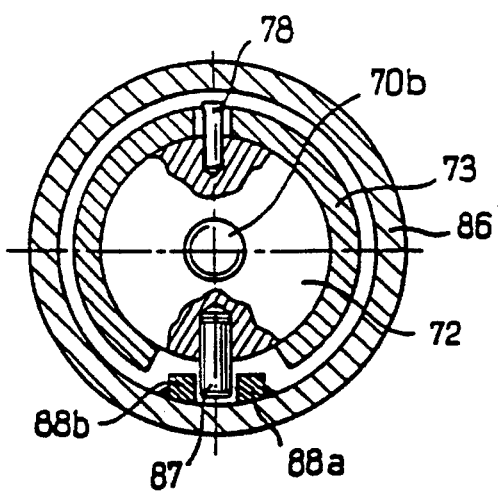
FIG_10

METHOD AND APPARATUS FOR TRANSMITTING INFORMATION RECORDED ON DIGITAL DISKS FROM A CENTRAL SERVER TO SUBSCRIBERS VIA A HIGH DATA RATE DIGITAL TELECOMMUNICATIONS NETWORK

This is a continuation of application Ser. No. 07/784,450, filed as PCT/FR90/00353, May 18, 1990, now abandoned.

DESCRIPTION

The present invention relates to a method and apparatus for transmitting information recorded on digital disks from a central server to subscribers via a high data digital telecommunications network.

The technical field of the invention is the construction of server centers and transmitting information such as sounds, images, or writing.

Digital disks "or compact disks" are known on which digital recordings are made of sounds, e.g. music, singing, or speech, or of video signals representing images, or of writing such as printed documents or software, for example.

Digital disk players are also known which serve to convert the digital information recorded on the disks into digital signals or into analog signals suitable for application to transducers which convert the signals into sounds, images, or writing.

Server centers are also known which include a central computer having alphanumeric information stored in its memory in the form of combinations of elementary binary signals or "bits". The server center is connected to a telephone network and it may be interrogated from a consumer computer terminal provided with a screen and a keyboard, thereby enabling information transmitted from the server center to be obtained on the screen.

In parallel with the telecommunications networks used for telephone calls, new high data rate digital networks are being constructed, for example, in France, an integrated services digital network (ISDN) is being constructed capable of conveying 64 kbits/sec.

However, the data rate of such a network is not sufficient for directly conveying information at the rate delivered by a digital disk having music or digital images recorded thereon.

Further, if it is desired to use a computer memory to store all of the digital information recorded on a collection of digital disks offering a wide selection, then it would be necessary to use a memory of very large capacity.

The object of the present invention is to provide a method and apparatus making it possible to use a central computer capable of dialoging with local terminals from which subscribers may inform the central computer of the selection of information they desire to receive at home, and to combine the central computer with a collection of digital disks stored in a central magazine together with a disk handling system controlled by the central computer for taking selected disks out from the central magazine one by one and applying them to optical players for said disks.

The object of the invention is achieved by means of a method of transmitting information recorded on digital disks from a central server to subscribers via a telecommunications network, wherein the method comprises the following sequence of operations:

a central server is set up comprising a central computer, a magazine in which a collection of digital disks is placed, each disk having a determined address which is stored in the memory of said central computer, a set of digital disk players which deliver separate analog signals and digital signals, and transfer means for transferring disks one by one between said magazine and said players, said transfer means being controlled by a controller connected to said central computer;

said central computer is connected to a communication interface circuit which is connected to a telecommunications network capable of conveying digital data at a high rate; and subscriber stations are connected to said network, each subscriber station including a remote computing terminal capable of dialoging with said central computer and means for transforming digital data transmitted by the network into analog signals representing sounds or images or writing, and each digital disk player is connected to said interface circuit with the telecommunications network via a filter which limits the passband of the analog signal, an analog to digital converter, a data rate reducing circuit, and a multiplexer, while each subscriber station is connected to the telecommunications network via a communications interface circuit, a demultiplexer circuit, a data rate expander circuit, a digital to analog converter, and a playback filter all connected in series.

Apparatus of the invention comprises:

a central server which is connected to a high data rate telecommunications network capable of conveying digital information, and subscriber stations connected to the said telecommunications network, said central server including a central computer, a magazine containing a very large number of digital disks with each disk corresponding to a digital recording of a determined title and having a determined address which is stored in the memory of said central computer, a plurality of players for said digital disks, and transfer means for automatically transferring disks one by one between said magazine and said players, which transfer means are controlled by a controller which is itself controlled by said central computer, each player being connected to a communications interface with said telecommunications network via a data rate reducing circuit comprising in series: a passband limiting analog filter, an analog to digital converter, a digital data rate reducing circuit, and a multiplexer, while each subscriber station includes a remote computing terminal capable of dialoging with the central computer, a communications interface and an electronic card including in series: a demultiplexer, a data rate expansion circuit, a digital to analog converter, a playback filter, and transducer means for converting analog signals into sounds, images, or writing.

In a preferred embodiment, the said transfer means for transferring disks one by one comprise self-propelled carriages which move beneath said disk magazine, a disk handling device for placing each disk on an available player, and a transfer conveyor which conveys disks between said carriages and said disk handling device and vice versa, which carriages, conveyor, and disk handling device include servomotors controlled by the said disk controller.

The result of the invention is to make it possible for subscribers connected to a high data rate telecommunications network to receive, in their homes, information recorded on a large collection of digital disks. In particular, it makes it possible to set up a central server constituting a music "stall" having a very large collection of audio compact disks, with the subscribers connected to the telecommunications network being free to request their own selections of music programs from the server and to receive them at home with very good, high fidelity type musical quality.

In this case, the result is the establishment of systems for delivering personalized music programs over the cables of a telecommunications network.

It is also possible to set up a central server having a collection of digital disks in which a library of written documents is recorded, for example reference material or literary works, and in this case subscribers may select the documents they wish to consult from a directory displayed on the screen, and they may then read the documents on a screen or they may print them out.

In another application, a central server may be set up having a collection of video compact disks, thereby enabling subscribers connected to a high data rate telecommunications network to receive personalized video transmissions on a video monitor screen, with the program being selected from a directory of disks available.

It is also possible to set up a central server having a collection of digital disks on which software is recorded, e.g. for games or any other application, and in this case subscribers may cause software they select from the server's directory to be downloaded into the memory of the remote computing terminal or of some other computer.

In this case, the result is the establishment of vast banks of software accessible to a large number of users over a public or a private telecommunications network.

Setting up central servers including a magazine of digital disks and a disk controller of the jukebox type under the control of a computer connected to a telecommunications network makes it possible to have a very wide collection of documents available since the capacity of the magazine may be very large. It also makes it possible to conserve the quality of the information obtained by optically reading digital disks, and in particular the quality of music and other sounds when the sounds are audio disks.

The following description refers to the accompanying drawings which show an embodiment of apparatus of the invention.

FIG. 9 is a vertical section through the disk-grasping clamp carried by the pivoting turret.

FIG. 10 is a cross-section through FIG. 9 on line X—X.

In the description below, reference is made to an apparatus for remote delivery of musical or sound programs recorded on digital disks for reading by laser. It is specified that this option is not limiting and that the digital disks could also contain software, images, or written documents recorded in digital form.

Figure 1:
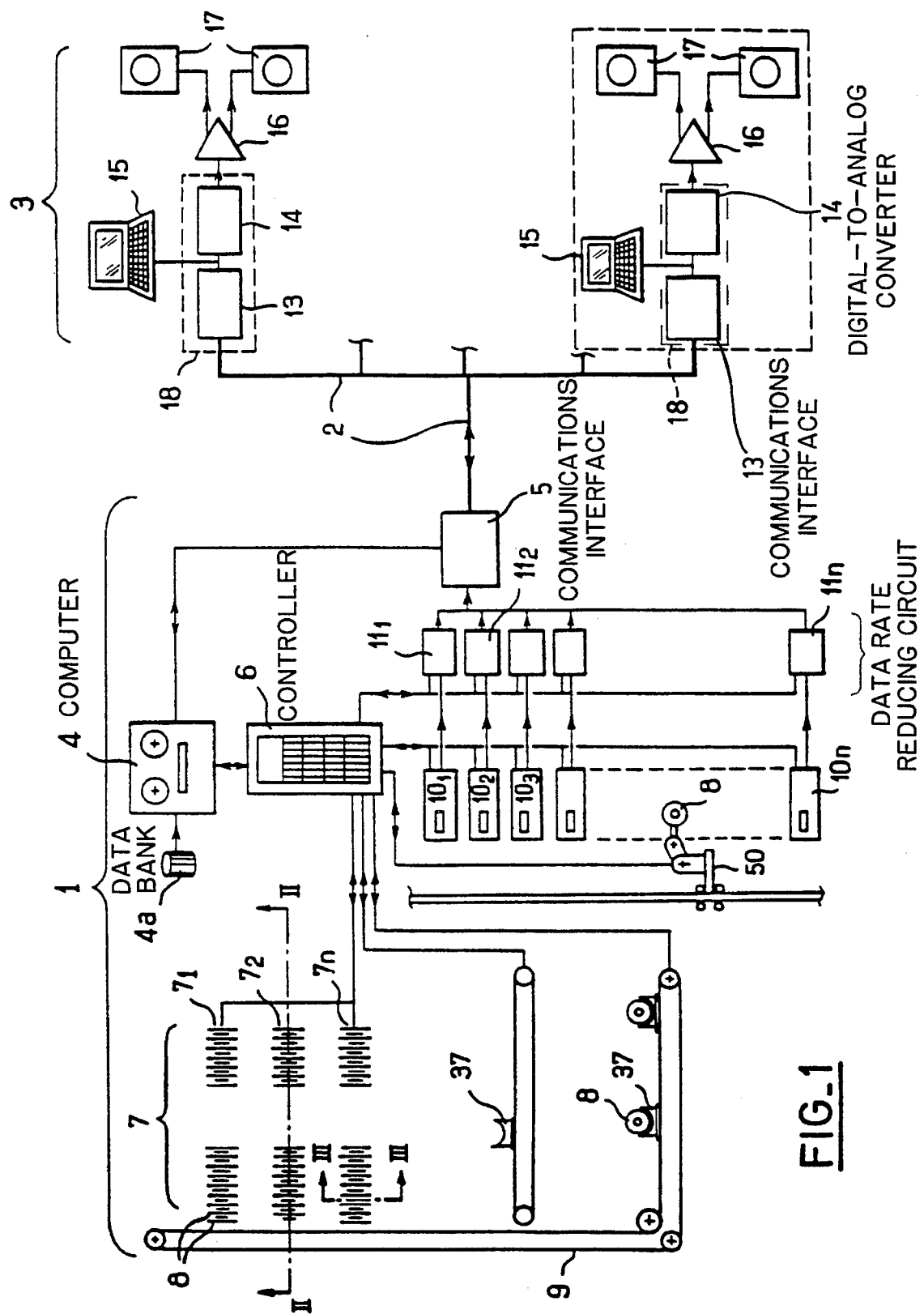
FIG. 1 is an overall diagram of apparatus of the invention.

The apparatus shown in FIG. 1 comprises a server center 1 which is connected to a high data rate telecommunications network 2 capable of conveying digital information at a high rate, e.g. a network of the integrated services digital network (ISDN) type capable of transmission at 64 kbits/sec.

The apparatus also includes a plurality of subscriber-serving stations 3 which are likewise connected to the telecommunications network 2.

The desired result is to enable each subscriber to call up one or more musical or sound programs selected from a list of a set of the disks available to the server center, and to receive the music or the sound over the network and to reproduce it locally.

For example, a public dance or concert hall connected to the network could thus select a sequence of pieces of music recorded in the central collection and could automatically output these pieces of music into the hall as though they were taken from an automatic disk player installed in the hall itself.

Given the quality of sound obtained by reproducing a recording on a digital disk, the data rate of the telecommunications network, and the possibility of performing highly complex signal compression and expansion operations in real time, it is possible to obtain good quality music reproduction in this way.

The server center 1 includes a programmable controller 6 controlled by a computer 4 which is connected to the network 2 by a communications interface circuit 5.

The computer 4 includes a peripheral memory 4a in which the encoded titles of all of the disks are stored, together with the addresses of the corresponding disks in the magazine.

The disk controller 6 receives instructions from the computer to cause servomotors fitted to various stations in the disk controller to perform operating cycles, and it transmits instructions to the various servomotors.

The programmable disk controller 6 is the machine which monitors and controls all of the various electromechanical equipment in the server center.

The server center includes a magazine for storing a set of available digital disks 8. The magazine is divided, for example, into a plurality of parallel rows $(7_1, 7_2, \ldots, 7_n)$.

The disks 8 are stored vertically and in axial alignment with each row. Each disk carrying the digital recording of a given piece of music occupies a given position in a determined row which constitutes the address of the disk as stored in the data bank 4a.

The rows of disks $(7_1, 7_2, \ldots, 7_n)$ are perpendicular to a transfer conveyor 9 which is preferably an endless chain of the universal-joint type, i.e. a chain made up of links which are hinged to one another about pairs of orthogonal axes.

The disks 8 are digital disks of any conventional type, e.g. compact disks for being read by means of a laser beam.

The server center includes a plurality of disk players $(10_1, 10_2, \ldots, 10_n)$ which are adapted to the type of disk 8 used.

It includes a handling arm 50 which is automatically controlled by the programmable controller 6. The handling arm 50 serves to grasp disks one by one as they arrive on the conveyor 9 and to place them in an available one of the disk players $10_1, 10_2, \ldots, 10_n$. When a disk has been played the handler serves to retrieve the disk and replace it on the transfer conveyor 9.

Each disk player $10_1, 10_2, \ldots, 10_n$ is connected to a data rate reducing circuit $11_1, 11_2, \ldots, 11_n$ which comprises a series connection of an analog filter for limiting the passband, an analog to digital converter, a digital signal data rate reducer, and a multiplexer whose output is connected to the communications interface 5 which transmits the digital signals to the network 2.

FIG. 1 shows a plurality of subscriber stations connected to the network 2. Each station includes a remote computing terminal 15 which may be constituted, for example, by a conventional type of consumer terminal including an alphanumeric keyboard, a video screen, and a communications interface 13 suitable for the telecommunications network 2.

The terminal 15 enables the subscriber to set up a call to the computer 4 of the server center and to inform the computer, by means of the keyboard, of the list of codes for one or more disks which the subscriber would like to receive or listen to.

Each subscriber station also includes an electronics card 18 which includes a demultiplexing module, a module (14) for expanding the digital signal data rate by performing the inverse operation to that performed by the data rate reducers contained in the circuits $11_1, 11_2, \ldots, 11_n$, a digital to analog converter (14), and a playback filter.

The circuits of the card 18 and the circuits $11_1, 11_2, \ldots, 11_n$ may be constituted, for example, by those used for wide band telephone sets, or they may be sound pickup and playback modules as used for audio conferencing, i.e. equipment already designed to be connected to the high data rate digital network 2. In the example described where subscribers desire to receive programs of music, the subscriber stations further include one or more high fidelity amplifiers 16 and headphones or one or more loudspeakers housed in acoustic enclosures 17.

Naturally, if the disks 8 are video disks, then the loudspeakers are replaced by video monitors.

If the disks 8 contain documentation, then the amplifiers 16 and the loudspeakers are replaced by electronic printers or a screen.

If the disks 8 contain software, the signals are transferred in digital form from the digital outlet of a player $10_1, 10_2, \ldots, 10_n$, to the memory of the terminal 15 or of some other computer connected to the communications card 13.

In all of these cases, each subscriber station includes conventional transducer means for converting the electrical analog signals from the card 18 into sounds, images, or writing depending on the nature of the information recorded on the digital disks at the server center.

Figure 2:
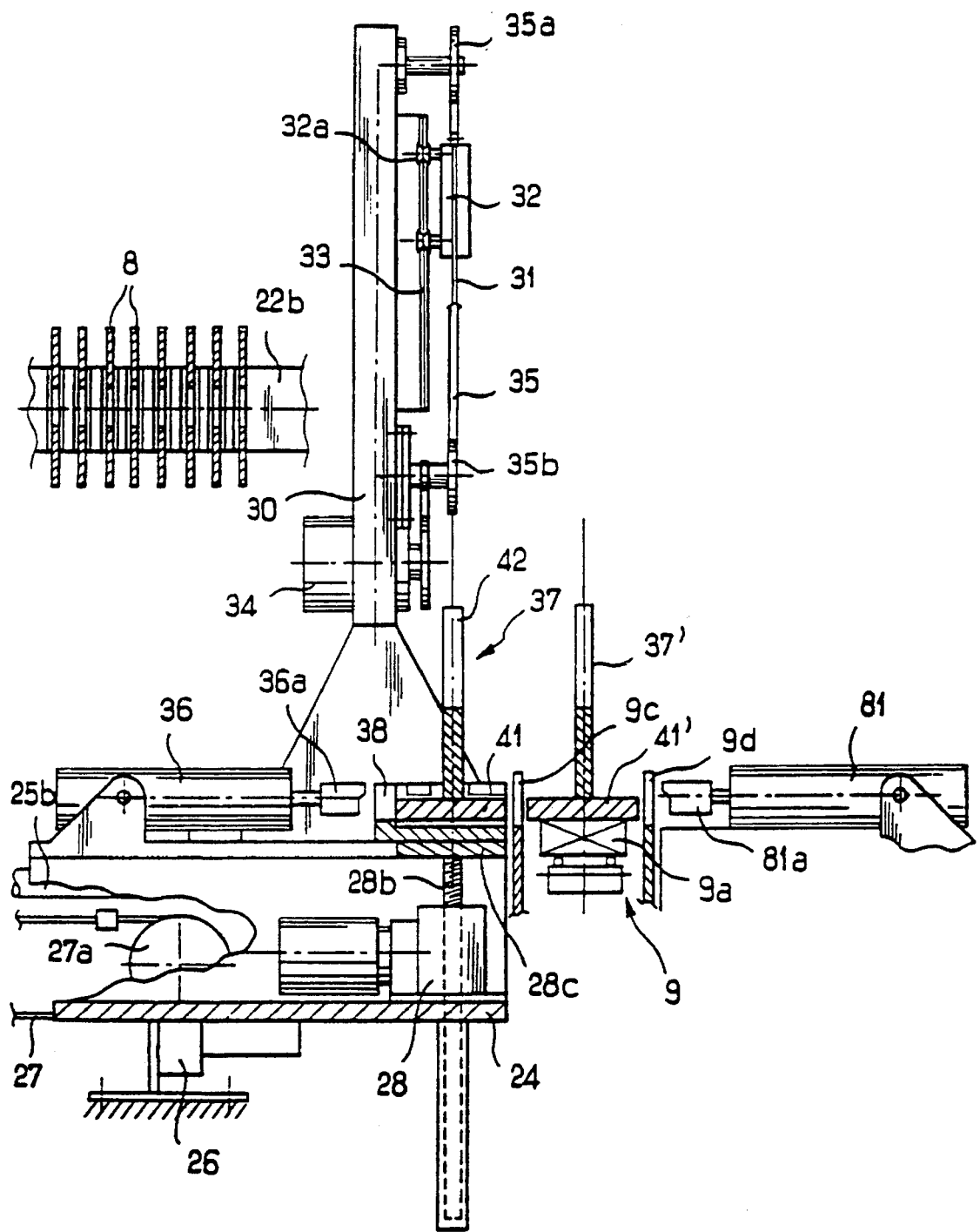
FIG. 2 is a vertical section on II—II of FIG. 1.
Figure 3:
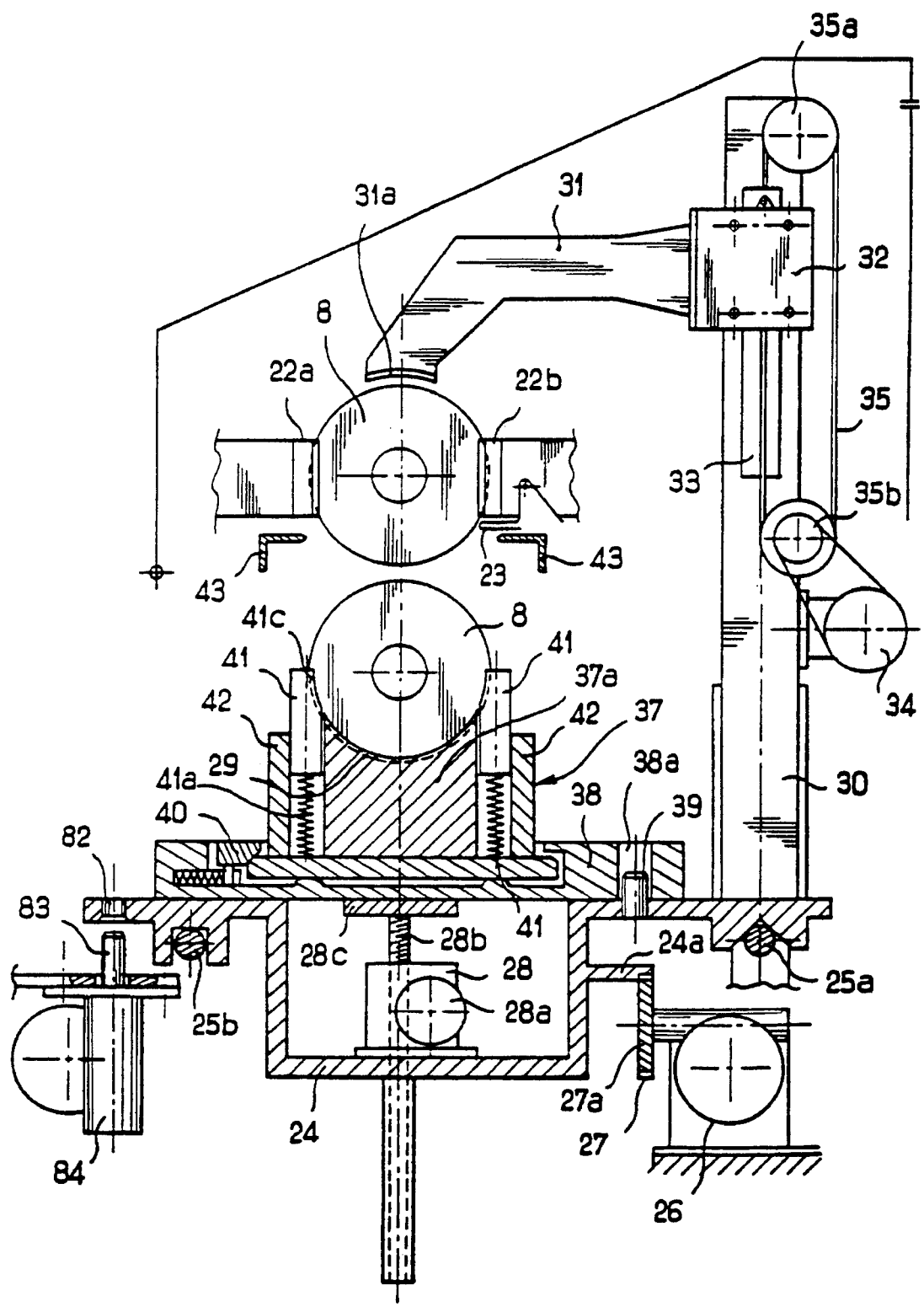
FIG. 3 is a vertical section on III—III of FIG. 1.

FIGS. 2 and 3 are views of one embodiment of the electromechanical means used for transferring selected disks one by one from the magazine to the conveyor and vice versa.

FIG. 2 is a section on II—II of FIG. 1 on a vertical plane perpendicular to the conveyor and including the axis of a row of disks 7.

FIG. 3 is a view on III—III of FIG. 1, i.e. a section in a vertical plane perpendicular to a row of disks in the magazine.

Digital disks 8 can be seen in FIGS. 2 and 3 where they are stored vertically between pairs of supports 22a and 22b having vertical grooves forming slideways, with each disk being received in one of the slideways.

Each disk 8 is retained by a retractable resilient finger 23 in the form of a pin. The capacity of a magazine may be 250 compact disks per linear meter, for example.

Each row of the magazine includes a disk loading and unloading carriage 24 which runs on a pair of horizontal rails 25a and 25b situated beneath the disks and running parallel to the axis of the row.

Each carriage 24 is driven in translation along its rails by a motor and gear box unit 26 which drives a cog belt 27 mounted on a drive pulley 27a and on a return pulley. The cog belt 27 (see FIG. 2) runs parallel to the rails 25. The chassis of the carriage 24 includes a finger 24a which is fixed to the top link of the cog belt and which follows the motion thereof. The cog belt extends over the entire length of a row of disks.

The carriage 24 includes a screw actuator 28 controlled by a servomotor 28a.

The threaded rod 28b of the actuator is vertical. Its top end carries a plate 28c fixed to a base 38 which delimits a slideway parallel to the rails 25a and 25b.

Reference 40 designates a moving wedge thrust by a spring 40a. The wedges 40 are used for positioning the foot of the disk support in the base 38.

The base 38 is vertically displaceable by the screw actuator 28.

The base 38 includes bores 38a in which centering pegs 39 fixed to the carriage 24 are engaged.

The base 38 receives a disk support 37 which comprises a foot 41 which is placed on the bottom of the base 38 and which is free to slide perpendicularly to the conveyor 9. The disk support also includes a vertical web 37a which extends parallel to the disks, with its top end being in the form of a circular arc having the same diameter as the disks and including a groove 29 in which a disk 8 may be received, as shown in FIG. 3. The disk support also includes two fixed lateral uprights 42 serving to guide two vertical fingers 41 thrust by springs 41a, which fingers have respective grooves 41b on their inside faces, said grooves being arcuate in shape and extending the groove 29.

FIG. 3 shows a disk 8 held in a vertical position by a disk support 37. This figure shows that the bottom half of the disk is engaged in the grooves 41c and 29 which together form a semicircle whose radius to the bottom of the groove is equal to the radius of the disk.

The carriage 24 also carries a vertical upright 30 which carries a bracket arm 31 whose end carries a circular sector 31a provided with a groove. The sector 31a is placed over the selected disk and pushes it downwards, thereby resiliently retracting the retractable finger 23 and releasing the selected disk. The arm 31 is carried on a carriage 32 which is fitted with wheels 32a running on vertical guide rails 33 fixed to the upright 30.

The carriage 32 is fixed to one of the lengths of an endless belt 35 passing over a return pulley 35a and a drive pulley 35b which is driven by a servomotor 34 via a transmission including pulleys and endless bolts.

The vertical displacement speed of the carriage 32 and thus of the sector 31a is identical to that of the screw actuator 28.

References 43 designate fixed abutments visible in FIG. 3 against which the retractable fingers 41 come into abutment when the screw actuator 28 raises the disk support 37.

FIG. 2 shows a disk support 37 mounted on the carriage 24 and one of the lengths 9a of the conveyor 9. In this figure, it can be seen that the conveyor 9 comprises an endless chain placed between two vertical plates 9c and 9d which include gaps facing each row of the disk magazine in order to allow the foot 41 of a disk support to pass therethrough.

In FIG. 2, it can be seen that the carriage 24 carries an actuator 36 whose moving head 36a pushes the foot 41 of the disk support located on the carriage, thereby causing the disk support to move onto the conveyor 9a which then conveys it to the handling arm 11 which grasps the disk to place it on a free one of the players $10_1, 10_2, \ldots, 10_n$.

FIG. 2 also shows a second actuator 81 provided with a head 81a. The installation includes one actuator 81 per row in the disk magazine. The actuators 81 are disposed on the opposite of the conveyor 9 to the disk magazine.

When a disk support 37' carrying a disk and coming back from a disk player arrives level with the magazine row into which the disk is to be returned, the moving head 81a of the actuator 81 pushes the foot 41' of the disk support back into the slideways delimited by the base 38 carried by the carriage 24.

FIG. 3 shows a vertical actuator 84 which actuates a rod 83 that penetrates into a ball 82 in the carriage 24.

When the carriage 24 reaches the position for loading or unloading a disk support 47 on the carriage, the actuator 84 is actuated by the disk controller 6 and the finger 83 penetrates into the bore 82 and holds the carriage stationary while the loading or unloading operations take place.

A transfer cycle during which a disk 8 is transferred from the magazine to the conveyor comprises the following steps:

the central computer 4 which knows the address of the selected disk sends the address to the controller 6. The controller 6 releases the carriage 24 corresponding to the row in which the disk is stored by retracting the finger 83. The controller 6 then controls the servomotor 26 of the row of the magazine containing the selected disk. It sends a reference value to this servomotor corresponding to the position of the disk in the row. The servomotor 26 automatically displaces the carriage 24 until the reference value is reached.

The disk support 37 carried by the carriage and the circular sector 31a are then vertically aligned with the selected disk. The controller then controls the actuator 28 which raises the disk support until the fingers 41 come into contact with the abutments 43.

The actuator 28 is stopped automatically before the disk support 37 makes contact with the selected disk.

The controller controls the servomotor 34 which lowers the arm 31 until it makes contact with the disk 8. Thereafter, the controller causes the arm 31 and the actuator 28 to move downwards simultaneously. The retractable finger 23 retracts and the disk moves downwards, being held both by the disk support 37 and by the circular sector 31a. Thereafter, the controller causes the carriage 32 carrying the arm 31 to move back up. The disk is then held by the two fingers 41 which are raised against either side of the disk under drive from the springs 41a.

The actuator 28 stops automatically when the base 38 makes contact with the carriage 24.

Thereafter, the controller controls the servomotor 26 to return the carriage to the end of the row adjacent to the conveyor 9. It then holds the carriage in place by controlling the actuator 84 and then controls the actuator 36 to push the disk support 37 carrying the disk 8 onto the conveyor which then conveys it to the handling arm 11.

During a cycle when a disk is being returned to the magazine, the actuator 81 pushes the support carrying the disk onto the carriage, and the controller then causes the same operations to be performed to bring the carriage vertically beneath the emplacement for the disk. When the carriage is in place, the actuator 28 raises the disk support, and as it moves upwards the disk pushes back the retractable finger 23. The bracket arm 31 is not used when returning a disk to the magazine.

Figure 4:
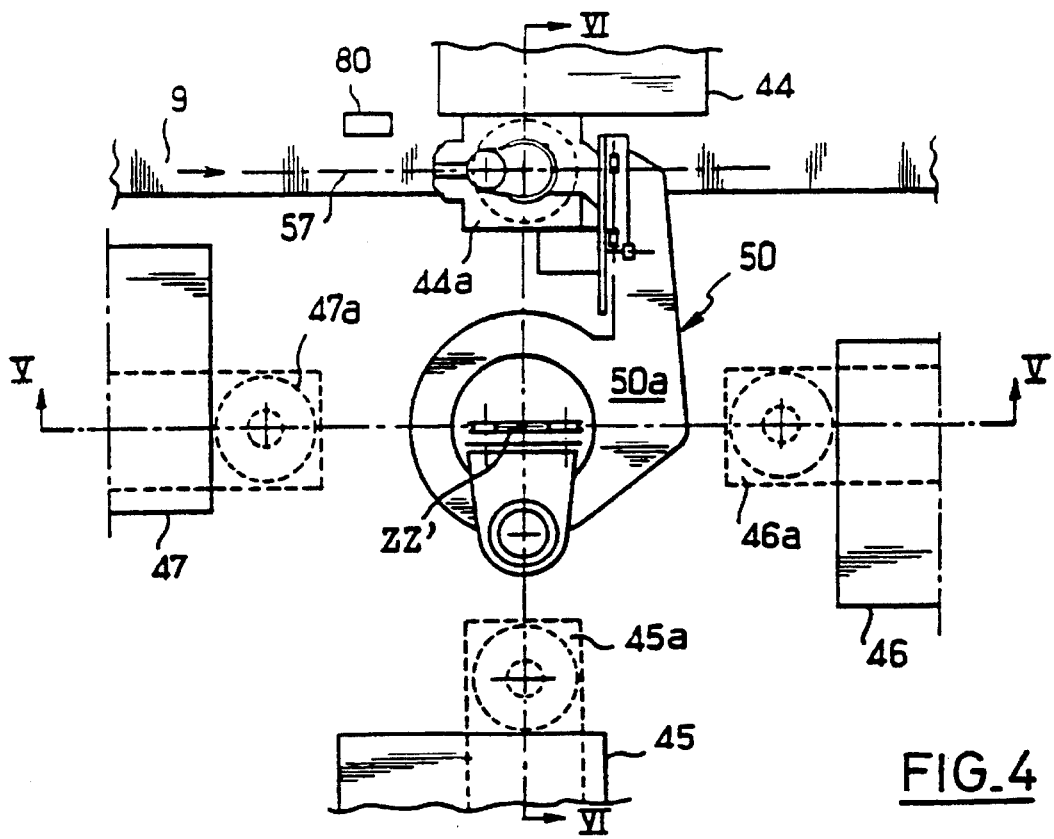
FIG. 4 is a plan view of a group of digital disks players.

FIG. 4 is a plan view of a handling device 50 serving a group of digital disk players comprising four columns of players 44, 45, 46, and 47 disposed in a cross configuration about a vertical axis zz'.

Dashed lines in FIG. 4 show disk-receiving drawers 44a, 45a, 46a, and 47a in the extended position. It can be seen that the centers of these drawers are disposed symmetrically about the axis zz'.

Reference 9 represents the transfer conveyor which transports the disk supports 37 each carrying a disk 8 in the vertical position.

Figure 5:
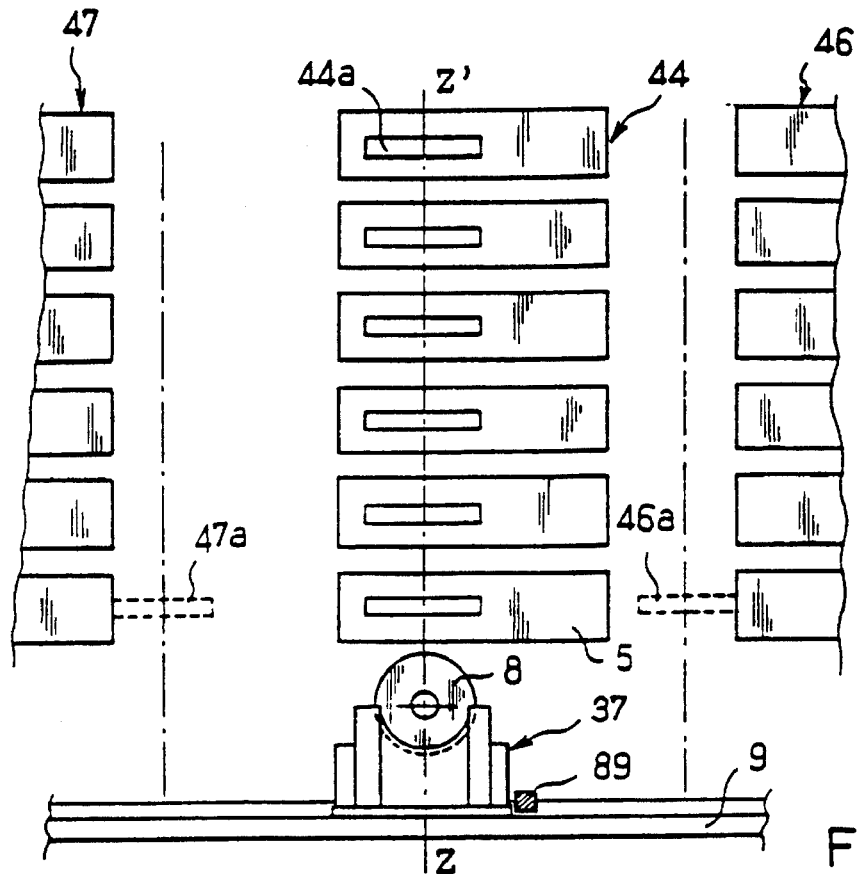
FIG. 5 is a vertical section on V—V of the group of FIG. 4 with a turret and disk-handling arm omitted.

FIG. 5 is an elevation view of the group of players on a plane containing the axis zz', with the disk transfer turret omitted. In FIG. 5, a disk support 37 carrying a disk 8 can be seen being displaced by the transfer conveyor 9.

Each disk support 37 carries a code, e.g. a bar code. Reference 80 designates a code reader. The code reader 80 transmits the code to the central unit which stores the code of the support that has conveyed a given disk.

FIG. 4 shows a turret 50 which is represented diagrammatically and which is centered in the middle of the group of four columns of players 44, 45, 46, and 47, with the turret having the function of taking a disk 8 that arrives via the conveyor 9, of raising it vertically over one of the four vertical axes passing through the centers of the drawers 44a, 45a, 46a, and 47a, of rotating it through 90° in order to take up a horizontal position, and of placing it in an available drawer.

Figure 6:
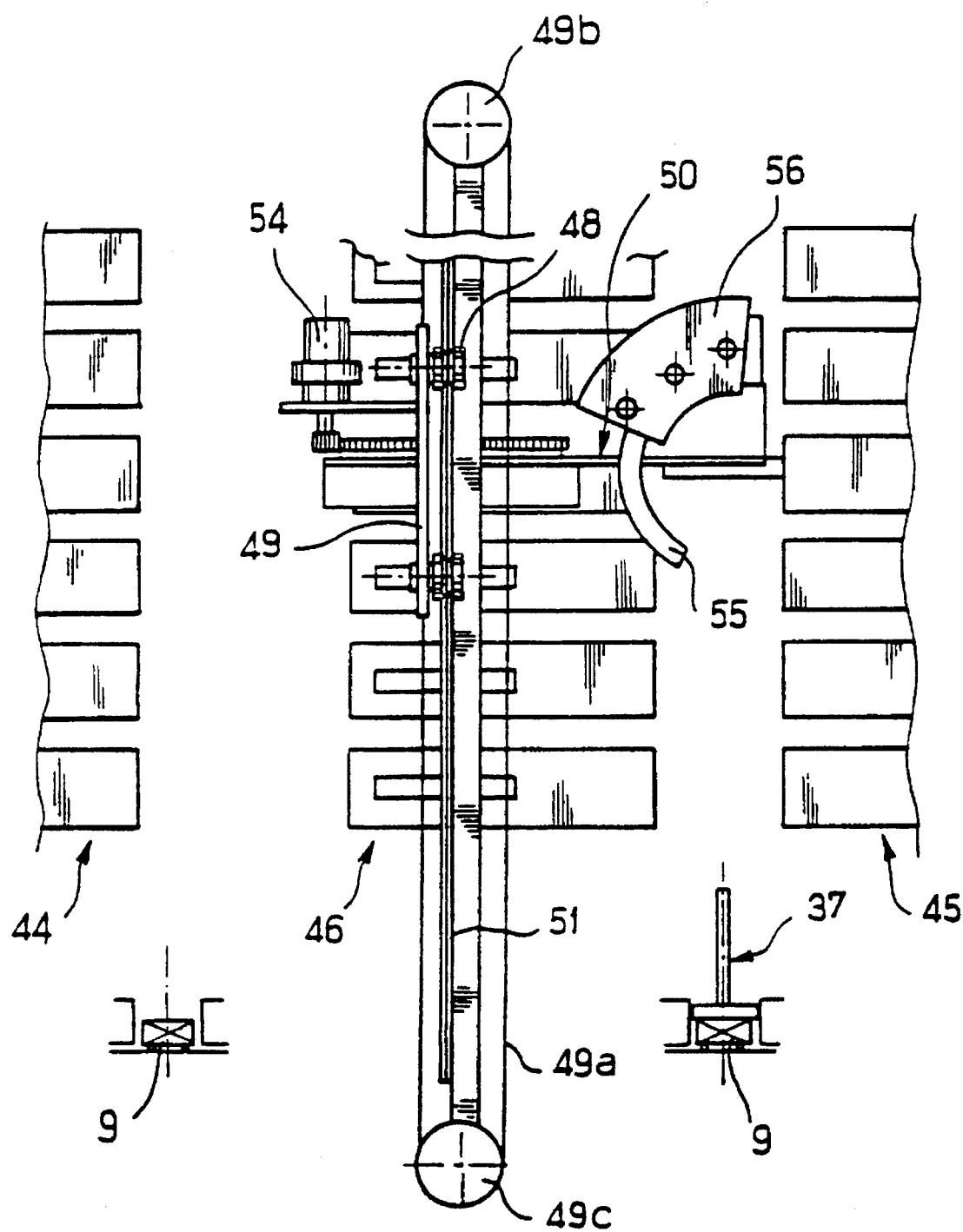
FIG. 6 is a diagrammatic elevation view of the pivoting turret.

FIG. 6 is a section on line VI—VI of FIG. 4.

Figure 7:
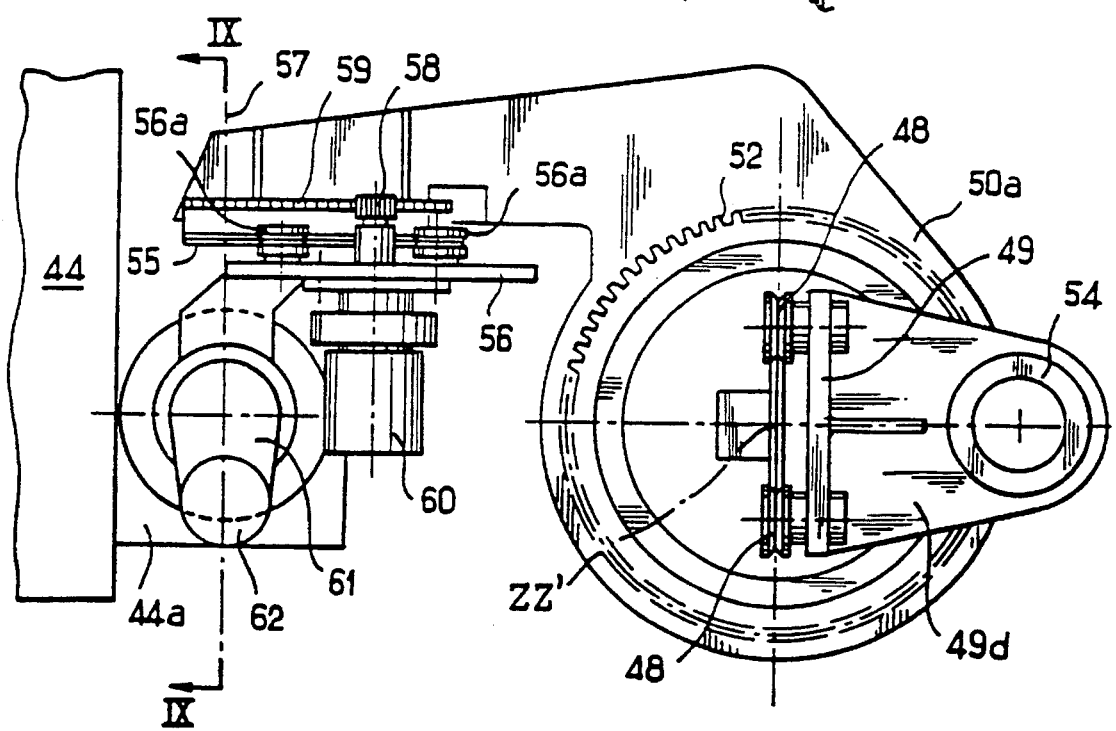
FIG. 7 is a plan view of the pivoting turret.

FIG. 7 is a plan view of the turret 50 serving the group of players.

Figure 8:
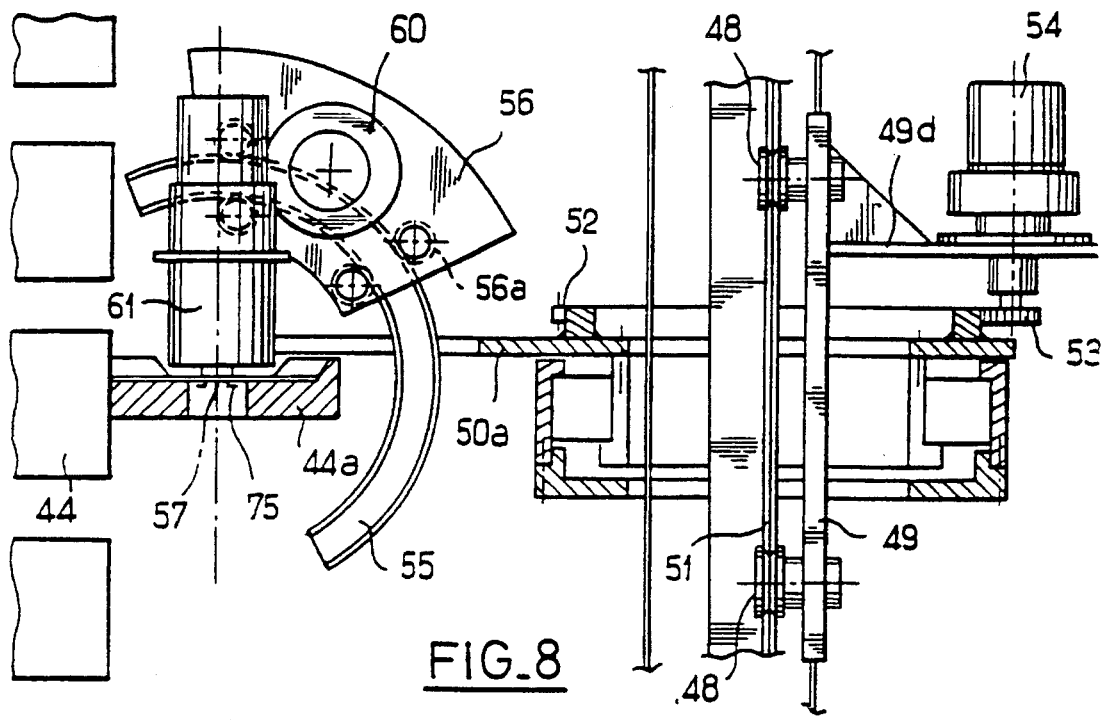
FIG. 8 is a fragmentary elevation view of the pivoting turret.

FIG. 8 is an elevation view of FIG. 7.

Reference 51 designates a fixed vertical guide plate which contains the axis zz' and which is disposed symmetrically thereabout.

The turret includes a carriage 49 fitted with four wheels 48 which run along the vertical edges of the guide plate 51.

In FIG. 6, it can be seen that the guide plate 51 extends over the entire height of the columns of players 44, 45, 46, and 47.

It can also be seen that the top and bottom ends of the carriage 49 are fixed to an endless belt 49a which passes over two return pulleys 49b and 49c situated respectively at the top end and at the bottom end of a vertical pole. One of the pulleys is rotated by a servomotor (not shown) under the control of the controller 6 for the purpose of displacing the carriage 49 vertically in order to bring it to the same height as an available player.

The carriage 49 carries a horizontal plate 49d on which a servomotor 54 is mounted, which motor is controlled by the controller 6 and serves to rotate a gear wheel 53 which meshes with a toothed ring 52. The toothed ring 52 is centered on the axis zz'. It is fixed to a plate 50a including a circular opening centered on the axis zz' and through which the guide plate 51 and the carriage 49 are engaged.

The plate 50a carries a fixed blade 55 in the form of a circular sector situated in a vertical plane which extends on either side of the plate 50a.

The two edges of the plate 50a are chamfered and provide a running path for grooved wheels 56a fitted to a carriage 56 in the form of a portion of a circular sector.

The carriage 56 carries a servomotor 60 which drives a gear wheel 58 which meshes with a portion of a fixed toothed ring 59 running parallel to the fixed blade 55.

The circular blade 55, the toothed ring 59, and the carriage 56 are all centered on a horizontal axis 57. The carriage 56 carries a mechanism 61 for actuating a compact disk clamp 57 actuated by a motor and gear box unit 62.

In this way, the motor unit 60 serves to displace the carriage 56 through 90° along the guide blade 55 so as to bring the disk clamp from the vertical position shown in FIG. 8 which is the position in which it places a disk horizontally on an available drawer 44a, all the way to a horizontal position shown in FIG. 9 which is the position in which it takes a disk placed vertically on a disk support 37 carried by the conveyor. FIG. 9 is an axial section through the disk clamp 75 and through its actuator mechanism shown in a horizontal position and in the process of taking hold of a vertical disk 8.

The top half of FIG. 9 shows the disk clamp 75 in its retracted position. The bottom half of FIG. 9 shows the disk clamp 75 in its position for engaging a disk 8.

The mechanism 61 includes a shaft 70 about an axis $xx_1$ which is supported by bearings 70a.

The end 70b of the shaft carries a male thread. The shaft 70 is rotated by a motor and gear box unit 71a via a belt transmission 71.

The mechanism 61 includes equipment that moves in translation parallel to the axis $xx_1$. This moving equipment includes a nut 72 which is screwed onto the threaded end 70b. The nut 72 carries an antirotation finger 87 which slides between two abutments 88a and 88b fixed to the housing 86. The nut 72 also carries a finger 78 which is engaged in an elongate slot 78a formed in the part 73. This finger allows limited sliding to take place between the parts 72 and 73 along the axis $xx_1$.

The nut 72 carries a ball abutment 76 thrust by a spring 76a which engages a notch in the part 73. The leading end of the part 73 carries clamps 75 which include leading hooks 75a hinged to rear portions. The nut 72 carries a conical part 77 at its leading end for engaging the hooks 75a when they are retracted.

The entire actuator mechanism of the disk clamp is enclosed in a circular housing 86.

The operating cycle of the clamp for grasping a disk 8 presented in a vertical position is as follows. The shaft 70 is initially placed so that the axis $xx_1$ is in alignment with the axis of the disk.

The servomotor 71a then displaces the nut 72 which advances, entraining the intermediate part 73, until it engages the abutment 78 forming a portion of the mechanism housing 86. At this moment the hooks 75a of the parts are folded back and they engage in the central orifice of the disk.

The nut 72 continues to advance, thereby retracting the ball abutment 76.

The conical part 77 then causes the hooks 75a to pivot and spread apart, thereby taking up the position shown in the bottom half of FIG. 9 and thus holding the disk.

In order to release a disk, the servomotor 71a drives the nut 72 and the conical part 77 rearwards, thereby initially folding back the hooks 75a which have return springs provided for that purpose.

As the nut 72 continues to move backwards, the finger 78 drives the intermediate part 73.

FIG. 10 is a section of FIG. 9 on line X—X showing the circular housing 86, the intermediate part 73, the nut 72, the threaded head 70b, the antirotation finger 87, the two abutments 88a and 88b, and the finger 78.

The disk controller 6 and the electromechanical installations described above enable one or several digital disks selected by a subscriber to be brought to the players $10_1$, $10_2$, ..., $10_n$ in one or more groups served by respective turrets each carrying a disk-handling arm.

Returning to FIG. 1, it can be seen that each player is connected to an interface 5 via a set of electronic circuits $11_1, 11_2, \ldots, 11_n$ which serve to compress the analog signals available at the outputs from the digital disk players in order to adapt them to the data rate of the telecommunications network.

The high quality of the sound obtained from an audio compact disk player is due to the high sampling frequency of the signals which is about 44 kHz, and to their vast quantizing scale which occupies 16 bits.

The data rate used for stereo is about 1.4 megabit/s, and this exceeds the capacity of the telecommunications network 2.

The considerable redundancy in voice and music signals makes it possible to reduce the binary data rate at the cost of more or less complex real time processing of the signal.

One implementation of such a data compression system consists in using the encoding subassembly of a wide band telephone set or of a sound pickup device for an audio conference, where such subassemblies generally use an "adaptive differential subband" encoding method.

Each circuit $11_1, 11_2, \ldots, 11_n$ then comprises in series: a filter module; an analog to digital conversion module; a data rate reducing module; and a multiplexing module.

The filter module comprises a lowpass filter which limits the passband to about 8 kHz, with this spectrum then being split into two bands of equal width. The module for analog to digital conversion samples each subband so as to preserve its characteristics as well as possible by means of a specific quantization range and sampling frequency. The compression module includes algorithms for reducing the number of bits per sample by taking account of the correlation between consecutive samples of the signal. The output from the data rate reducing circuit is connected to a multiplexing module which receives bits in parallel and outputs them in series.

Reference 5 in FIG. 1 represents an interface circuit constituted by a conventional set of electronic cards for providing communication between the central server and the telecommunications network 2 which may be a public network or a private network.

The disk controller 6 controls the various electromechanical equipments of the central server in a manner analogous to the disk handler of a jukebox. The controller 6 controls the carriages serving each row of the storage magazine 7, the, or each, transfer conveyor, the handling arm 50 which transfers disks from the conveyor 9 to the players $10_1, 10_2, \ldots, 10_n$ and back again, and the code readers placed along the conveyor for reading the codes on the disk supports.

The computer 4 is the central control member of the server. It handles the interactive dialog with the terminals 3 that call it, it stores their requests, it transmits the addresses of the selected disks to the disk controller, and it supervises operation of the controller 6 by maintaining permanent dialog therewith.

The terminals 3 are used for consulting the data base of available titles, for selecting some of them, and for listening to the music or voice transmitted therefrom.

The terminals 3 may be home type terminals intended, for example, for use by an individual desiring to listen to a musical program at home without having to buy the disks or a disk player.

In this case, the terminal includes a consumer remote computing terminal having a video screen and an alphanumeric keyboard enabling the user to call the computer of the server center and specify a list of selected disks.

The terminal also includes a communications interface circuit for connection to the digital network 2, an expansion module which may be, for example, a module of the kind used in a wide band telephone set and which includes a demultiplexing circuit, a data rate expansion module, a digital to analog converter, and a playback filter.

In addition, each terminal includes a high fidelity type amplifier and loudspeakers or headphones.

When a subscriber desires to receive music or voice for public occasions, e.g. in dance or concert halls, the terminal includes components performing the same functions. However, in this case, the data rate expander device and the data rate compression device 11 are not standard products as used in high quality telephony.

In order to provide sound of very good quality, a device is used which includes very elaborate signal processing, in particular when using subband encoding, by increasing the passband of the signal, by increasing the number of subbands, by implementing noise-reducing means, and still retaining a data rate which is compatible with the communications network 2.

The general operation of apparatus of the invention for enabling a subscriber station to receive sounds, images, or writing selected from a digital disk directory comprises two stages. The first stage is interactive dialog between the terminal 15 of the subscriber station and the central computer 4.

The subscriber calls the central computer over the network 2. Once connection has been established, the subscriber may receive an available menu on the screen of the terminal, i.e. a directory of all the titles from which the user may make a selection, e.g., when the disks contain music, a directory of all the musical works available at the central server.

The subscriber makes up a program to be received by using a function key of the keyboard to select titles pointed to in succession by a cursor on the screen.

The second stage is a stage during which the program selected by the subscriber is executed automatically.

The central computer verifies whether the first title of the selection is available in the magazine. If it is available, the computer sends the address of the disk to the disk controller, i.e. the number of the row in which the disk is placed and the position of the disk within the row, together with the address of an available disk player. The disk controller then sets into motion a cycle of operations to transfer the disk and cause it to be played. The controller records the code of an empty disk support as read from a support going past the code reader.

It causes the support to be transferred to the storage magazine. When the support comes level with the magazine row containing the selected disk, the controller actuates the actuator 81 facing the row, thereby transferring the disk support onto the self-propelled carriage 24 which had been held in position by the finger 83. The controller 6 then causes the finger 83 to be retracted, thereby releasing the carriage 24. The controller sends the co-ordinate of the selected disk to the servomotor 26 of the carriage and the carriage goes automatically to that co-ordinate. The controller then causes the actuator 28 to rise and it then lowers the bracket arm 31 before simultaneously lowering the actuator 28, after which the self-propelled carriage returns to the head end of the magazine row and the carriage is locked in place by the finger 83, after which the actuator 36 is displaced to eject the disk support carrying the selected disk onto the conveyor which transfers it to the group of disk players where it is stopped by a retractable abutment 86 (visible in FIG. 5) while the conveyor continues to advance. The abutment 86 is automatically controlled by a code reader 80 which reads the code of the disk support.

The controller then causes the handling device 50 serving the group of players to pick up the disk in the vertical position, to pivot it into the horizontal position, and to place it on the drawer of the available player.

Thereafter, the controller moves the handling device out of the way, closes the drawer, and causes the disk to be played or just the track of the disk containing the title selected by the subscriber.

For a musical recording, the player is a laser player which reads digital information and transforms it into analog electrical signals. These analog signals are filtered, converted back into digital signals, and then processed to reduce the data rate of the signals to be transmitted prior to transmitting them over the high data rate telecommunications network.

Before the playback cycle of the selected track of digital disk No. 1 has terminated, the controller performs another disk transfer cycle to bring the second musical work requested by the subscriber onto a second available player so that the second musical work requested by the subscriber can be transmitted immediately or very shortly after the end of the first work, and so on.

After each disk has been read, the disk controller instigates a cycle for returning the disk to the magazine with the disk always being stored therein at the same address.

Digital disks mounted in cassettes are also known as are players for such disks. The central server may include a magazine of such disks mounted in cassettes, players for such disks, and a disk handling device 50 suitable for placing disks in cassettes on players adapted to playing back from such disks.

I claim:

1. Apparatus for transmitting information recorded on disks from a central server to subscriber stations, said apparatus comprising:

a high data rate telecommunication network for two-way communication between said central server and said subscriber stations;

said subscriber stations connected to said telecommunication network, each of said subscriber stations comprising a communication interface connected to said telecommunication network, computer means connected to said communication interface, input means for inputting information to said computer means, output means for outputting information from said computer means, a module connected to said communication interface for expanding digital signals received from said telecommunication network, a digital-to-analog converter connected to said module for converting said digital signals into analog signals, and transducer means connected to said digital-to-analog converter for converting said analog signals into humanly perceptible signals;

said central server comprising a central communication interface connected to said telecommunication network, plural data rate reducing circuits connected to said central communication interface, plural disk players, each of said disk players connected to one of said plural data rate reducing circuits, a magazine storing said disks, central memory means for storing titles of said disks together with corresponding addresses of said disks in said magazine, central computer means connected to said telecommunication network by said central communication interface and connected to said central memory means, transfer means for automatically transferring said disks between said magazine and said disk players, said transfer means comprising plural self-propelled carriages disposed beneath said disk magazine, at least one disk handling device for placing said disks on said disk players, and a transfer conveyor which conveys said disks between said carriages and said at least one disk handling device, a controller connected to said central computer means, connected to said plural disk players, and connected to said transfer means, wherein in response to instructions from said central computer means, said controller controls said plural self-propelled carriages, said transfer conveyor, and said at least one disk handling device to transfer a selected disk to a selected disk player, controls said selected disk player to retrieve digital signals from said selected disk, controls a selected one of said plural data rate reducing circuits to compress said digital signals output by said disk player, and causes said central communication interface to transmit said compressed digital signals to a selected one of said subscriber stations via said telecommunication network.

2. Apparatus according to claim 1, wherein said magazine comprises a plurality of mutually parallel rows perpendicular to said transfer conveyor, each of said rows containing a plurality of said disks disposed vertically and corresponding to one of said plurality of self-propelled carriages and wherein each of said carriages is displaced in translation by one of said servomotors along a pair of rails situated beneath said corresponding row and extending parallel thereto.

3. Apparatus according to claim 2, wherein each of said self-propelled carriages includes a vertical screw actuator supporting a base which delimits a slideway perpendicular to said transfer conveyor for receiving a disk support, and a horizontal actuator for causing said disk support to slide in said slideway and for engaging said disk support on said transfer conveyor.

4. Apparatus according to claim 3, wherein each of said self-propelled carriages further includes a vertical upright supporting a vertically displaceable carriage, said vertically displaceable carriage carrying a bracket-forming arm including a circular sector at its end, the radius of said circular sector being equal to the radius of said disks, said circular sector bearing against the top of said selected disk in order to push it downwards, thereby causing a resilient pin holding said selected disk in place to retract.

5. Apparatus according to claim 3, wherein each said disk support includes a horizontal foot bearing against the bottom of said base, a vertical plate parallel to the plane of said disk and having a top end in the form of a circular arc having the same radius as said disk and including a groove in which said selected disk is engaged, and two sliding fingers whose inside faces include respective circularly arcuate grooves, said fingers are urged upwards by springs.

6. Apparatus according to claim 1, wherein said at least one disk handling device includes a self-propelled carriage provided with wheels for moving vertically along a fixed vertical guide plate disposed symmetrically about a vertical axis with said disk players being disposed in columns around said vertical axis.

7. Apparatus according to claim 6, wherein said horizontal plate supports a fixed blade in the form of a circular arc and situated in a vertical plane, together with a further self-propelled carriage which is displaced along said fixed blade, said further self-propelled carriage including a disk clamp and an actuator mechanism therefor.

8. Apparatus according to claim 7, wherein said disk clamp carries a plurality of leading hooks each having a hinged end, and said actuator mechanism includes a shaft which is rotated by a further servomotor and which has a threaded end, and a nut screwed on said threaded end and prevented from rotating by a finger, said nut driving a conical part which causes said leading hooks to open.

9. Apparatus according to claim 6, wherein said self-propelled carriage of said at least one handling device includes a servomotor which rotates a toothed ring fixed to a horizontal plate and surrounding a circular opening cut out in said horizontal plate and centered on said vertical axis, with said guide plate and said self-propelled carriage of said at least one disk handling device being engaged through said circular opening.

10. Method of transmitting information recorded on disks from a central server to subscriber stations via a high data rate telecommunication network for two-way communication between said central server and said subscriber stations, said central server including a central communication interface connected to said telecommunication network, plural data rate reducing circuits connected to said central communication interface, plural disk players, each of said disk players connected to one of said plural data rate reducing circuits, a magazine storing said disks, central memory means for storing titles of said disks together with corresponding addresses of said disks in said magazine, central computer means connected to said telecommunication network by said central communication interface and connected to said central memory means, transfer means for automatically transferring said disks between said magazine and said disk players, said transfer means comprising plural self-propelled carriages disposed beneath said disk magazine, at least one disk handling device for placing said disks on said disk players, and a transfer conveyor which conveys said disks between said carriages and said at least one disk handling device, a controller connected to said central computer means, connected to said plural disk players, and connected to said transfer means;

each of said subscriber stations including a communication interface connected to said telecommunication network, computer means connected to said communication interface, input means for inputting information to said computer means, output means for outputting information from said computer means, a module connected to said communication interface for expanding digital signals received from said telecommunication network, a digital-to-analog converter connected to said module for converting said digital signals into analog signals, and transducer means connected to said digital-to-analog converter for converting said analog signals into humanly perceptible signals;

said method including the steps of:

initiating a two-way transmission from said subscriber computer means of one of said subscriber stations to said central computer means of said central server via said telecommunication network;

transmitting from said central computer means to said subscriber computer means via said telecommunication network a directory of disks available in said disk magazine and outputting on said subscriber output means said directory of available disks in said disk magazine;

selecting at least one of said available disks by means of said subscriber input means and transmitting a signal identifying said at least one selected disk from said subscriber computer means to said central computer means via said telecommunication network;

reading at said central server from said central memory means an address in said disk magazine corresponding to each of said at least one selected disk;

verifying that each of said at least one selected disk is available in said disk magazine;

transmitting each corresponding address of each verified at least one selected disk from said central computer means to said central controller;

controlling said plural self-propelled carriages, said transfer conveyor, and said at least one disk handling device to transfer each verified at least one selected disk to a selected disk player;

playing at the central server each verified at least one selected disk on a disk player to retrieve digital signals therefrom;

compressing said retrieved digital signals by means of a selected one of said plural data rate reducing circuits;

transmitting said compressed digital signals to said one of said subscriber stations via said telecommunication network;

expanding said transmitted digital signals by said data expanding module, converting said expanded digital signals into analog signals by said digital-to-analog converter, and delivering said analog signals to said transducer means.

\* \* \* \* \*